Figure 1:
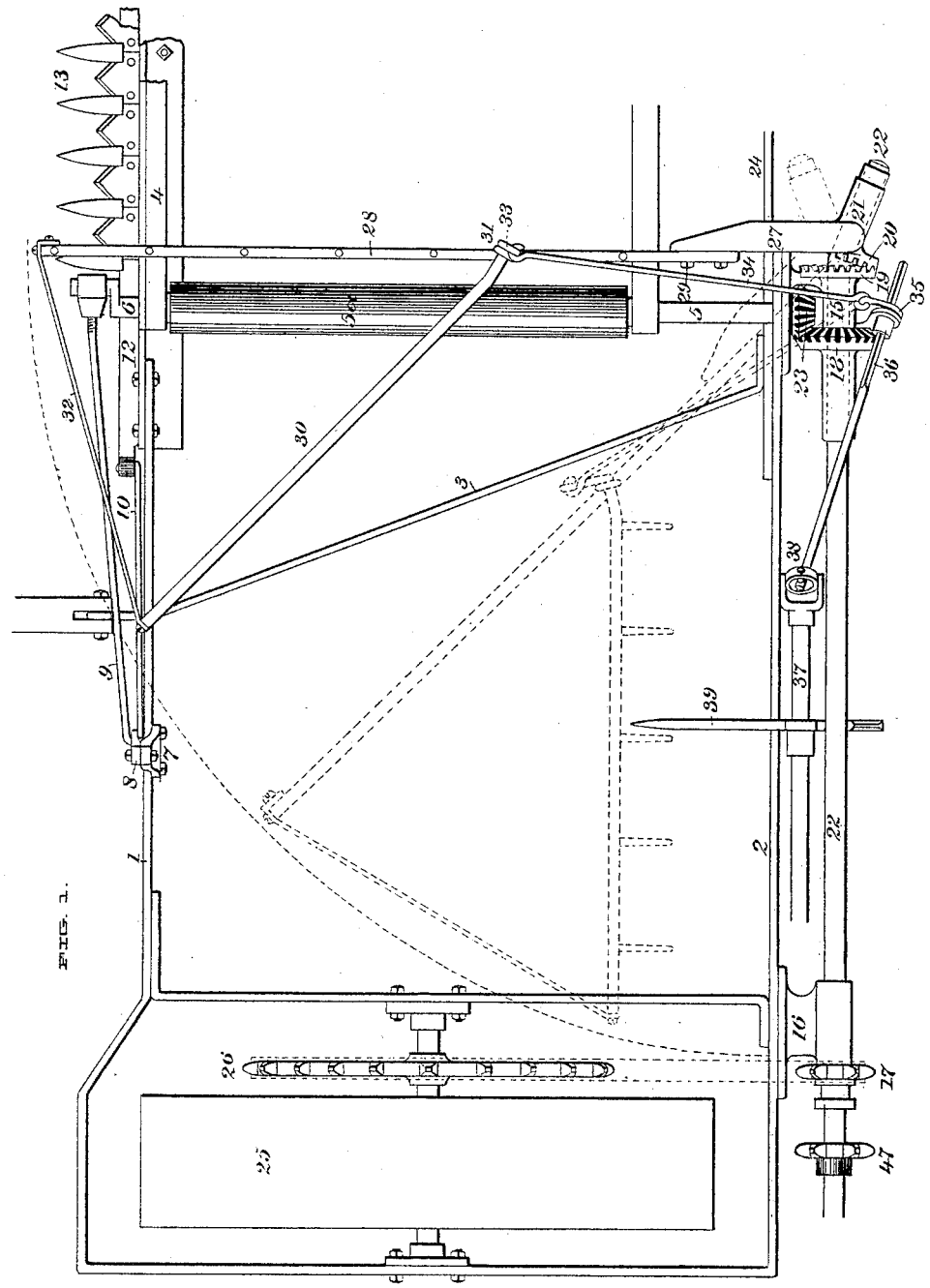

(No Model.)  2 Sheets—Sheet 2.

E. G. WATROUS.
HARVESTING MACHINE.

No. 581,797.  Patented May 4, 1897.

WITNESSES,
William Wilcox
Emily Scott

INVENTOR,
EARL G. WATROUS,
BY Franklin Scott, Attorney

UNITED STATES PATENT OFFICE.

EARL G. WATROUS, OF HOOSICK FALLS, NEW YORK.

HARVESTING-MACHINE.

SPECIFICATION forming part of Letters Patent No. 581,797, dated May 4, 1897.

Application filed November 22, 1893. Serial No. 491,627. (No model.)

*To all whom it may concern:*

Be it known that I, EARL G. WATROUS, of the village of Hoosick Falls, in the county of Rensselaer and State of New York, have invented certain Improvements in Harvesting-Machines, of which the subjoined description, in connection with the accompanying drawings, constitutes a specification.

This invention relates to special apparatus for conveying the cut straw from the apron or platform in rear of the cutter-bar to the binding-table. It is fully set forth in the drawings, in which—

Figure 2:
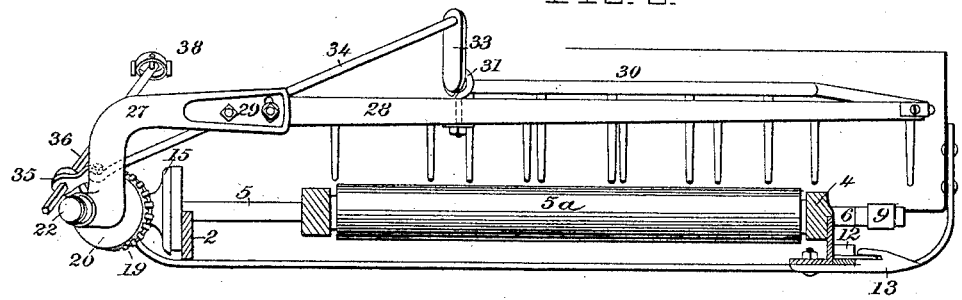
Figure 3:
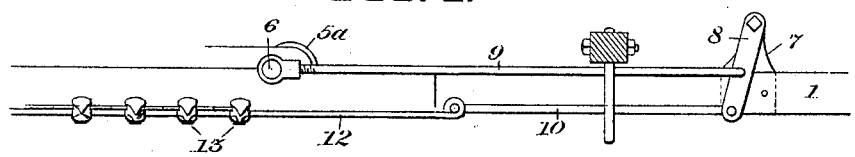

Figure 1 is a plan of a portion of a harvester-frame, showing my improvements in connection therewith. Fig. 2 is an elevation of a transverse section of the machine, taken just inside of the pitman-shaft. Fig. 3 is an elevation of so much of the front of the machine as exhibits the connections between the driving-crank and the cutter-bar.

My improvements are shown as mounted on a harvester-frame 1 2 3 4. One of the rollers 5 is shown, over which runs an endless apron in rear of the cutter-bar, as is found in many existing machines. The shaft of this roller extends through the bearing in the side piece 1 of the frame and carries on such projecting end the driving-crank 6.

A standard 7 is attached to the front of the machine, upon which is pivoted a sway-bar 8, which is connected with the crank 6 by pitman 9. The sway-bar 8 is connected with the cutter-bar 12 by means of connecting-rod 10, which is pivoted to its free end. The pitman 9 is connected with the sway-bar at a point between its pivot of oscillation and the pivot of attachment of the rod 10. By these means a long stroke of the cutter-bar is obtained with a relatively much shorter pitman-stroke. Thus if the pitman is attached to the sway-bar at a point half-way between its pivot of oscillation and the point of attachment of the cutter-bar rod or connection the cutter-bar rod will have a stroke just twice that of the crank. These devices permit the cutter-bar to be driven from one of the apron-roller shafts, thus avoiding the use of a special pitman-shaft, and by the use of the sway-bar in the manner shown a limited crank-throw is utilized to impart adequate stroke to the cutter-bar.

The apparatus devised for transferring the cut crops from the delivery-apron to the binding-table is as follows: In this machine the binder is located somewhat beneath and behind the driver and the binding-table is only slightly more elevated than the surface of the delivery-apron itself. The needle-arm swings in a plane parallel with the line of advance of the machine, thus making it necessary to swing the cut straw as it leaves the apron a quarter-turn, so as to lay it in position on the binding-table athwart the gap therein, through which the needle-arm plays. The bundle is discharged behind the operator and in the rear of the machine.

By reference to Fig. 1 most of the characteristic features of this invention can be made out. The main wheel is shown at 25, and its shaft carries a sprocket-wheel 26, from which connection is made with chain with the pinion-sprocket 17 on shaft 22. This shaft also carries another sprocket 47, from which the binder is driven. Shaft 22 runs in fixed bearings 15 and 16, which are attached to the frame of the harvester substantially as shown. On shaft 22 is the fixed bevel driving-gear 18, which meshes with and drives the bevel-pinion 23, which is carried on the end of roller-shaft 5 opposite crank 6. Shaft 22 after it passes out of bearing 15 is bent or cranked at an angle, substantially as shown, and carries the bevel-gear 20 on such cranked projection, the crank being free to turn within the hub 21 of the gear. The gear 20 meshes with a counterpart 19, which is stationary and in this case is a part of the stand or bearing 15, and as the shaft revolves the teeth of the gear 20 follow round the intervals between the teeth of the fixed gear 19, whereby a nutatory motion of the axis of gear 20 is produced. This peculiar motion so produced is availed of to communicate to a sweep-rake a motion appropriate to swing the cut straw around from the position it naturally takes on the apron to a position across the path of the needle-arm, at right angles therewith, the rake-head during this operation describing, approximately, the fourth of a circle in its travel and then returning to its first position. For such purpose from the hub 21 is erected a bracket-arm 27, to which a rake-head 28 is adjustably fastened by the bolt 29. From rake-head 28 a supplemental rake-head 30 projects at such an angle as will swing the straw when under the binder-head in a position substantially parallel with the shaft 22. The supplemental rake 30 is journaled at 31 in a bearing, and its outer end is also fitted to turn on a pin on the end of arm 32, which is rigidly attached to and projects from the outer end of rake-head 28. It is fitted with an upturned arm 33, which is connected by link 34 with a crank 35, which is carried on the end of the square shaft 36 and is fitted so that said shaft can slide through its hub. Shaft 36 is connected with the end of the needle-arm shaft 37 by a universal joint 38, and its movements respond to those of the latter shaft during the operation of binding; but at all other times they respond only to the influences produced by the rotation of the cranked end of shaft 22 within gear 20. When the binding devices are not at work, or during the accumulation of straw to form a bundle, the shaft 22 runs constantly, thereby producing a swinging reciprocating motion of the rakes through the arc of a circle having the crank-bend in shaft 22 as its center. The principal and auxiliary rake-heads are so disposed that the forward sweep of the rear or main rake will carry the straw around and forward to a position on the table where it will be caught on the termination of the rear stroke of the auxiliary rake and thence on its forward stroke swept around into its proper position to be caught by the needle-arm 39 in the process of binding the next bundle.

Hence I claim as my invention—

1. In a harvesting-machine the combination of a needle-arm shaft, a rake-head 30 and connections from said shaft to said rake-head, with a rake-head 28, to which rake-head 30 is journaled, projecting therefrom at an angle, and the hub of a nutating gear-wheel which carries rake-head 28 substantially as set forth.

2. The combination with the main rake, attached to or connected with the nutating gear, of the supplemental rake pivotally connected at an angle therewith, the needle-arm shaft, means connecting said shaft with the supplemental rake for oscillating it, and means for adjusting the angle of the said main rake with its support substantially as set forth.

3. The combination with the main rake, attached to or connected with the nutating gear, of the supplemental rake pivotally connected at an angle therewith, the needle-arm shaft and means connecting said shaft with the supplemental rake for oscillating it, substantially in the manner described and for the purposes specified.

In witness whereof I have hereto subscribed my name this 23d day of September, 1893.

EARL G. WATROUS.

In presence of—
 FRANKLIN SCOTT,
 WILLIAM WILCOX.